Figure 1:
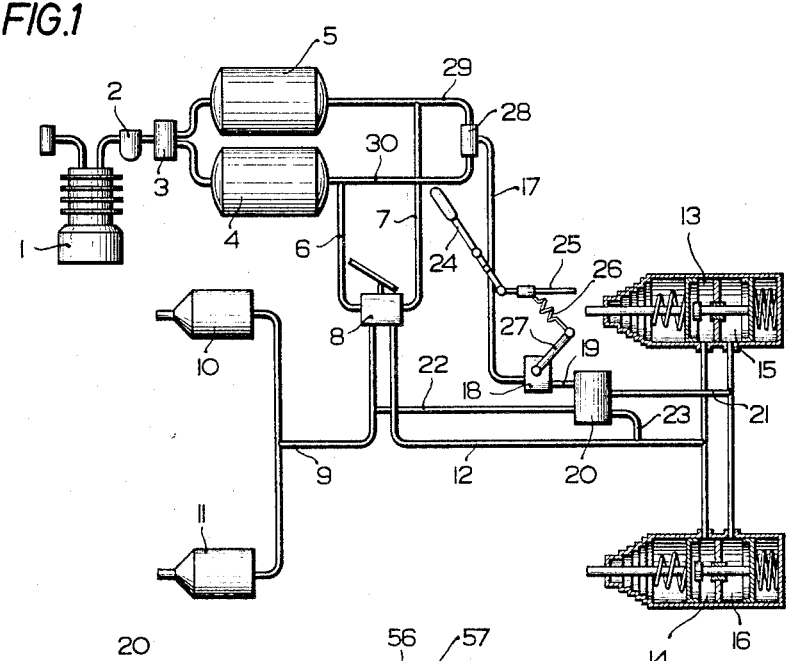

INVENTOR
Oskar Vielmo
by Michael J. Striker
Atty

United States Patent Office 3,273,950
Patented Sept. 20, 1966

3,273,950
BRAKING INSTALLATION FOR VEHICLES
Oskar Vielmo, Stuttgart-Sonnenberg, Germany, assignor to Robert Bosch G.m.b.H., Stuttgart, Germany
Filed Sept. 17, 1964, Ser. No. 397,132
Claim priority, application Germany, Sept. 17, 1963, B 73,543
10 Claims. (Cl. 303—9)

The present invention relates to braking installations, particularly for vehicles.

As is well known, the wheels of conventional vehicles such as automobiles, truck, and the like are provided with braking units which respond to fluid pressure for applying the brakes of the vehicle so as to retard the movement thereof. In addition to fluid-pressure brakes, the rear wheels in particular of the vehicle will be provided with spring-pressure brakes, and during normal operation when the operator actuates a main valve, through a foot-pedal, for example, the fluid-pressure brakes of all of the wheels will be operated, while when the vehicle is to be stopped for a given period of time, as when the vehicle is parked, the operator will actuate an auxiliary valve to hold the vehicle stationary with the spring-pressed brake means which act on the rear wheels, this auxiliary valve of course forming part of a hand-operated emergency or parking brake assembly which is also well known in the art.

If it should happen that for some reason one of the braking units which operates by fluid pressure is not operating properly, as, for example, if there should be an unexpected leak in one of the fluid lines, then when the operator actuates the main valve he will of course notice, assuming that the leaking is large enough, that the vehicle is not reducing its speed properly and assuming that the operator is alert enough he will of course actuate the hand brake used for emergency or parking purposes, so that in this way the spring-pressure brake means will be brought into operation to retard the movement of the vehicle. However, there may be circumstances when the operator will not have sufficient opportunity to actuate the auxiliary parking or emergency braking system, so that when the main braking system is actuated through the foot pedal and the vehicle is not properly retarded an accident may occur before the operator realizes that he should call the emergency or parking brake structure into play.

A primary object of the present invention is to avoid the above difficulty by providing for vehicles a braking installation which if there should be improper operation of a braking unit due to a leak in the line or the like will automatically call the emergency or parking braking structure into operation in response to actuation of the main braking system by depression of the braking pedal, so that it will not be necessary for the operator to physically manipuate the parking brake system in order to apply the latter and thus the operation of the vehicle will be rendered much safer since with the structure of the invention if the primary fluid-operated braking system fails to operate properly the application of the conventional brakes will call the emergency braking system into operation in a fully automatic manner.

It is a further object of the present invention to provide for an installation of the above type a source of fluid pressure which has multiple fluid paths one of which will be maintained operative if it should happen, for example, that another fluid path does not remain fluidtight.

Also, it is an object of the present invention to provide a structure of the above type which is easily combined with existing conventional braking systems, so that in order to use the structure of the invention it is not required to provide an entirely new braking installation which is designed in a manner completely different from existing braking installations.

In particular, it is an object of the invention to provide a structure which will automatically detect the fact that a braking unit of the vehicle is not operating properly and which upon detection of this condition will automatically render the spring-pressed braking structure operative when the operator continues to operate the vehicle as if the fluid-pressure braking structure thereof were operative.

With these objects in view the invention includes, in a braking assembly for vehicles, a braking unit which has a fluid-pressure brake means and a spring-pressure brake means. A source of fluid under pressure communicates with both of these brake means for rendering the spring-pressure brake means inoperative while a main valve is accessible to the operator for applying the fluid under pressure to the fluid-pressure brake means to actuate the latter during normal operation of the vehicle. In accordance with the present invention there is placed in communication with the fluid-pressure and spring-pressure brake means a structure which when there is a drop in pressure of the fluid of the fluid-pressure brake means will automatically release the fluid pressure from the spring-pressure brake means to render the latter operative when the operator actuates the main brake valve.

Figure 2:
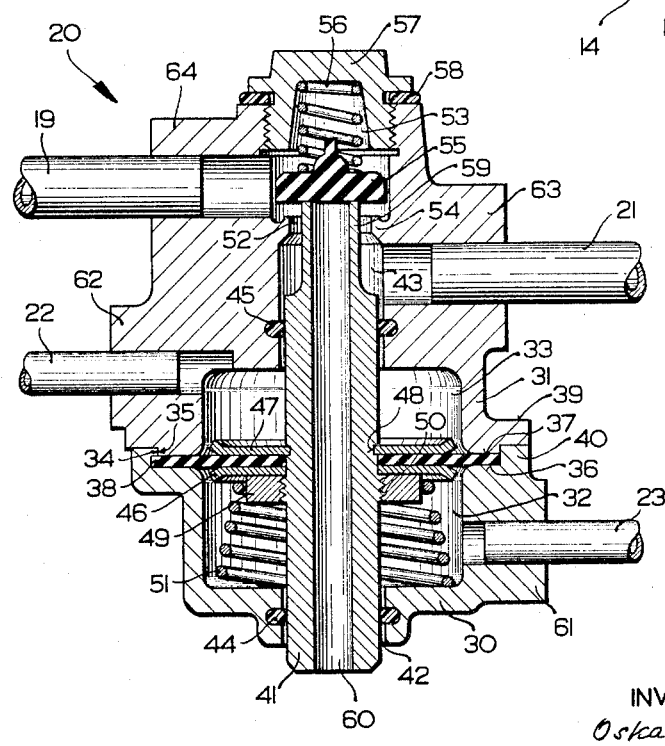

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a schematic illustration of a braking system which includes the structure of the invention; and FIG. 2 is a sectional elevational view showing in detail a differential valve assembly of the invention.

The structure of the invention is illustrated as operating with a fluid pressure in the form of compressed air, so that for the purposes of illustrating the invention a pneumatic braking system is shown in the drawings.

Referring now to FIG. 1, there is illustrated therein an air compressor 1 which supplies through a pressure regulator 2 and a safety valve 3, which has a pair of fluid paths, air under pressure which is contained in the tanks or containers 4 and 5, so that these containers form a pair of containers for the fluid which is under pressure. A pair of conduits 6 and 7 communicate with the fluid-pressure containers 4 and 5 and are operatively connected with a main braking valve means 8 of conventional construction and operated by a foot-pedal, as is well known. Thus, the unit 8 forms an operator-actuated main valve means for applying the pressure fluid to the braking units. A conduit 9 leads from the valve means 8 to a pair of single-chamber braking cylinders 10 and 11 carried, for example, by the front wheels of the vehicle, and these braking units 10 and 11 operate exclusively with fluid pressure so that they are provided only with a fluid-pressure braking means for actuating the brakes of the front wheels. A second conduit 12 leads from the valve 8 to a pair of rear single-chamber braking cylinders 13 and 14 which also include fluid-pressure brake means, so that when the operator actuates the valve 8 the fluid under pressure will flow to the front units 10 and 11 to the rear units 13 and 14 so as to actuate all of the fluid-pressure brake means for retarding the movement of the vehicle. As is well known, when the main valve 8 is not actuated by the operator so that this main valve 8 is in its rest position, it prevents communication between the conduits 6 and 7 and the conduits 9 and 12 while the latter are placed in communication with the outer atmosphere, so that at this time the plurality of fluid-pressure brake means are at atmospheric pressure and thus the brakes of the vehicle are retracted and inoperative so that the movement of the vehicle is not retarded. Upon actuation of the valve 8 the conduits 6 and 7 are placed in communication with the fluid-pressure braking means through the conduits 9 and 12 so as to apply the brakes with the fluid pressure in a manner well known in the art.

The units 13 and 14 which are respectively connected with the rear vehicle wheels also include spring-pressure braking means 15 and 16 of conventional construction, and it will be noted that the unit 13, 15 has a partition between the fluid-pressure and spring-pressure brake means thereof, while the unit 14, 16 is constructed in the same way. In a manner well known in the art when fluid under pressure is applied to the fluid-pressure means 13, 14 the brakes of the rear wheels will be applied, and also when the spring-pressure brake means 15 and 16 are called into play the brakes of the rear wheels will also be applied.

The containers 4 and 5 communicate also with a conduit means which includes three branches 29, 30, and 17, with branches 29 and 30 respectively communicating with the fluid-pressure containers 5 and 4 while the third branch 17 communicates with the branches 29 and 30 through a two-way valve means 28 situated at the location where the three branches meet. This two-way valve means 28 is constructed in a manner known in the art so that if there should be a leak, for example, in one of the lines 29 or 30 then the branch 17 will still be supplied with fluid under pressure through the other of the lines. In other words the valve 28 will respond automatically to a drop in pressure of one of the lines 29 and 30 to cut off communication between the leaking line and the conduit 17 so as to maintain the latter in communication with that one of the branches 29 and 30 which is still fluid-tight, and thus even under these conditions one of the tanks or containers 4 and 5 will remain through a fluid-tight branch in communication with the conduit 17.

An auxiliary operator-actuated valve means 18 is operatively connected with the conduit 17 for controlling the flow of fluid therethrough, and this auxiliary valve means 18 is adapted to be operated by hand for bringing into play the auxiliary parking or emergency braking system which includes the spring-pressure brake means 15 and 16. The valve 18 communicates through a conduit 19 with a differential valve means 20 of the invention, and this differential valve means 20 communicates through a conduit 21 with the pair of spring-pressure brake means 15 and 16. During normal operation the flow of fluid through the conduit 17, the valve 18, the conduit 19, the differential valve means 20, and the conduit 21 is maintained open so that during normal operation of the vehicle the fluid under pressure from one or both of the containers 4 and 5 is applied to the spring-pressure brake means 15 and 16 in order to maintain the latter inoperative in a manner well known in the art.

The pair of conduits 9 and 12, which respectively communicate with the front and rear fluid-pressure brake means, respectively communicate through branch conduits 22 and 23 with the differential valve means 20 of the invention.

A manually turnable lever 24 is accessible to the operator for actuating the auxiliary valve means 18 through a linkage 25 which is also capable in a manner well known in the art of applying the force exerted by the operator to the brakes which are controlled by the spring-pressure brake means, and in the linkage is located an equalizing spring 26 which provides a uniform turning of a lever 27 in response to turning of the lever 24 by the operator, also in a manner well known in the art. Thus, the transmission of the turning of the lever 24 to the valve 18 will actuate the latter to bring the spring-pressure brake means 15 and 16 into play.

Assuming that all of the above-described parts are in proper working order, then if the operator actuates the main valve 8, the single chamber braking cylinders 10 and 11 on the one hand and the single chamber braking cylinders 13 and 14 on the other hand will be actuated in the manner described above by receiving fluid under pressure so as to retard the movement of the vehicle. At this time the spring-pressure brake means 15 and 16 are maintained inoperative as a result of the fluid pressure acting thereon in the manner described above also. The units 18 and 20 maintain the fluid under pressure from the tanks 4 and 5 flowing to the chambers where the spring-pressure brake means 15 and 16 are located so as to maintain the spring-operated brake means inoperative with their springs compressed so that when this fluid pressure is eliminated the springs will expand to apply the brakes. The valve 18 maintains communication between the conduits 17 and 19 as long as the lever 24 is in the release position for releasing the hand-operated brakes, and the differential valve means 20 will maintain the conduits 19 and 21 in communication with each other as long as this differential valve means 20 detects a substantially equal fluid pressure in the conduits 22 and 23 so that the differential means of the differential valve means 20 is maintained at substantial equilibrium.

When the operator actuates the hand brake, with all the parts in proper working order, then the valve 18 will in a well known manner first cut off communication between the conduits 17 and 19 and then place the conduits 19 and 21 in communication with the outer atmosphere so that the fluid pressure acting on the spring-pressed brakes 15 and 16 will drop to atmospheric pressure and the springs will then respond so as to apply the brakes on the rear wheels. At this time, during normal operation, the conduits 19 and 21 are still maintained in communication with each other through the differential valve means 20. The cutting off of the communication between the conduits 17 and 19 at this time by the manual actuation of the valve 18 prevents any loss of fluid pressure from the containers 4 and 5. The differential valve means 20 still maintains communication between the conduits 19 and 21 inasmuch as the differential means of the differential valve means is still maintained substantially at equilibrium due to the substantially equal pressures prevailing in the conduits 22 and 23. Inasmuch as an auxiliary valve means which operates in the above-described manner is well known in the art, further details of the valve 18 are not shown or described. The details of the structure of the valve means 18 form no part of the present invention.

If it should happen that for any reason the path of fluid flow from the main valve 8 to the rear fluid-pressure braking means 13 and 14 loses its fluid-tightness, then when the operator actuates the main valve 8 there will of course be less fluid pressure on the rear fluid-pressure brake means 13 and 14 than on the front fluid-pressure brake means 10 and 11, and if the pressure acting on the rear fluid-pressure brake means 13 and 14 is at this time low enough, the differential means portion of the differential means 20 will detect the fact that the differential pressure is greater than a predetermined amount and this differential valve means 20 will now operate automatically to close the conduit 19 and to place the conduit 21 in communication with the outer atmosphere so that the fluid pressure will no longer act on the spring-pressure brake means 15 and 16 to maintain the latter inoperative, and the pair of spring-pressure brake means 15 and 16 will now automatically come into play to retard the movement of the vehicle under these conditions.

As was mentioned above, the valve 28 will maintain the communication between the branch 17 and that one of the branches 29 and 30 which is fluid-tight, in the event that one of these branches loses its fluid-tightness for any reason. Without this arrangement, if it should happen that one of the branches 29 or 30 lost its fluid-tightness, then it could happen that the spring-pressure brake means 15 and 16 would become operative without any actuation of the valves 8 or 18 by the operator, and the vehicle would be brought to a stop against the will of the operator, so that the maintenance of the conduit 17 in communication with one of the conduits 29 and 30 even if the other one thereof leaks, for example, prevents such an occurrence.

The differential valve means 20 of the invention is shown in detail in FIG. 2. This valve means includes a differential means portion which is shown at the lower part of FIG. 2 and a valve means portion which is shown at the upper part of FIG. 2. The differential means portion of the differential valve means 20 includes a housing made up of components 30 and 31 which are fixed to each other and which have hollow interiors 32 and 33, respectively, of the same diameter, these hollow interiors being of cylindrical configuration and forming a hollow interior portion for the housing provided by connection of the components 30 and 31 to each other in the manner illustrated in FIG. 2. The housing part 31 has an outer centering projection 35 which is received in the interior of a centering projection 34 of the housing part 31 which surrounds and engages the portion 35. The housing parts 30 and 31 also have end faces 36 and 37 which are directed toward each other and between which a flexible deformable membrane or diaphragm 38 is clamped or fixed in the manner shown in FIG. 2. The housing part 30 has a flange 40 and the housing part 31 has a flange 39, and suitable bolts, screws, or the like extend into these flanges for fixing the housing components 30 and 31 to each other with the diaphragm 38 extending across the hollow interior of the housing to divide this hollow interior into the pair of chambers 32 and 33 which are of equal diameters, as pointed out above.

The diaphragm 38 is formed with a central opening passing therethrough, and an elongated tubular member 41 extends through the central opening of the diaphragm 38, and this tubular member 41 having opposed open ends. The lower open end 60 of the tube 41, as viewed in FIG. 2, is in permanent communication with the outer atmosphere. The tube 41 extends through a bore 43 formed in the housing portion 31 and through a bore 42 formed in the housing portion 30, these bores being coaxial with the cylindrical chambers 32 and 33. The housing portions 30 and 31 respectively carry in their bores 42 and 43 sealing rings 44 and 45 which slidably engage the exterior surface of the tube 41 so as to fluid-tightly close the chambers 32 and 33.

The diaphragm 38 is situated between a pair of washers 46 and 47. The washer 47 extends at its inner periphery into an annular groove 48 which is formed in the exterior of the tubular member 41, and an exteriorly threaded portion of the tubular member 41 is threaded into a nut 49 which is threaded onto the threaded portion 50 of the tubular member 41 and which presses the washer 46 against the diaphragm 38, so that the tubular member 41 is in this way fixed with the diaphragm 38 for movement therewith by passing therethrough. A coil spring 51 of generally frustoconical configuration is situated in the chamber 32 surrounding the tubular member 41 and pressing against the bottom wall of the housing portion 30 as well as against the washer 46, so that the force of the spring 51 is transmitted to the tubular member 41 so as to urge the latter upwardly.

The valve means portions of the differential valve means 20 includes an annular valve seat 54 which surrounds a reduced upper end portion of the tubular member 41, as viewed in FIG. 2, with substantial clearance so as to define therewith an annular gap 52 which forms a space surrounding the tubular member 41, and it is through this annular space or gap 52 that the bore 43 communicates with a chamber 53 of the upper housing component 31, this chamber 53 having a substantially cylindrical configuration. The valve means portion also includes a valve member 55 which is made of a yieldable plastic material, rubber, or the like. This valve member 55 is adapted to be seated on the valve seat 54 of the valve means portion of the differential valve means 20. The valve member 55 engages the bottom end of a coil spring 56 which extends into the hollow interior of a plug 57 which is threaded onto the housing component 31 so as to close the cylindrical chamber 53 thereof, and a sealing ring 58 is clamped between a flange of the plug 57 and an exterior annular surface of the housing component 53 which surrounds the plug 57, as indicated at the upper part of FIG. 2. The spring 56 of course opposes the spring 51 and seeks to press the valve member 55 onto the valve seat 54.

The upper reduced end portion 59 of the tubular member 41 also has an open end, but this open end in the position of the parts shown in FIG. 2 is closed by the valve member 55 which is maintained in the illustrated position displaced from the valve seat 54 by the force of the spring 51. It will be seen while in this position, the valve means is in effect in a closed position closing the top end of the tubular member 41 while at the same time opening the gap 52 so that the conduits 19 and 21 can freely communicate with each other through the gap 52. Therefore, when the differential valve means is in the equilibrium position indicated in FIG. 2, or in the region of this equilibrium position, the top end of the tubular member 41 will be closed by the valve member 55 while at the same time there will be free communication between the conduits 19 and 21 so that the fluid under pressure can have access to the spring-pressed brake means 15 and 16 so as to maintain the latter in their inoperative positions.

Assuming now that for some reason the rear fluid-pressure brake means, or the conduits communicating therewith, lose their fluid-tightness, then when the operator actuates the valve 8, the branch 23 will of course have a lesser pressure than the branch 22, and inasmuch as these branches respectively communicate with the chambers 33 and 32 situated on opposite sides of the diaphragm 38, this diaphragm will respond to this pressure differential. If the pressure in the branch 23, and thus anywhere in the conduit 12, is substantially less than the pressure in the branch 22, so much so that the difference between these pressures exceeds a predetermined amount, then the result will be when the operator actuates the valve 8 that the diaphragm 38 will be deflected downwardly to an extent sufficient to cause the spring-pressed brake means 15 and 16 to become actuated. At this time pressure in the chamber 33 is greater than the pressure in the chamber 32 plus the force of the spring 51 by an amount which is sufficient to deflect the membrane 38 downwardly, as viewed in FIG. 2, so as to displace the tubular member 41 downwardly by a distance sufficient first to locate the valve member 55 on the valve seat 54 and then to displace the top end of the tubular member 41 downwardly away from the valve member 55. Now the valve means is in a second closed position where the valve member 55 engages the valve seat 54 so as to cut off communication between the conduits 19 and 21, and it will be noted that in this way there will be no escape of fluid under pressure from the containers 4 or 5. At the same time, when the parts are in this position the conduit 21 will communicate through the top end of the tubular member 41 with the interior thereof and through the bottom open end 60 thereof with the outer atmosphere, so that the pressure acting on the spring-pressed brake means 15 and 16 quickly drops to atmospheric pressure and the spring-pressed brake means 15 and 16 operate to apply the brakes which otherwise would be applied only upon manual actuation of the lever 24.

Therefore, with the structure of the invention if it should happen that there is a leak in the conduit 12 or in any part of the path of fluid pressure flow to the fluid-pressure brake means 13 and 14 beyond the valve 8, the structure of the invention will automatically bring the spring-pressed brake means into operation and the vehicle will be properly retarded in its movement, and it may well be that the operator will not even be aware that the vehicle is being braked by the spring-pressed brake means since all that the operator does is actuate the main valve 8 in the usual manner at this time.

When the operator releases the valve means 8 for return to its rest postion, the differential valve means 20 returns to its equilibrium position inasmuch as the fluid-pressure brake means 10 and 11 as well as the fluid-pressure brake means 13 and 14 are both placed at atmospheric pressure when the valve 8 returns to its rest position, and therefore the equilibrium positions again obtain and the parts return to the position indicated in FIG. 2. The displacement of the valve member 55 away from the valve seat 54 by the movement of the tubular member 41 at this time in an upward direction, as viewed in FIG. 2, results in closing of the top end of the tubular member 41 and again re-establishing communication between the conduits 19 and 21, so that the fluid pressure again acts on the spring-pressed brake means 15 and 16 to maintain the latter inoperative. When the single-chamber fluid-pressure brake means are returned to atmospheric pressure by release of the valve 8 for return to its rest position, the springs of the fluid-pressure brakes retract the pistons thereof so as to place the fluid-pressure brake means also in the release position, and operation of the vehicle can then continue in a normal manner.

Thus, with the structure of the invention it is possible to continue to brake the vehicle in the normal manner even if it should happen that the conduits supplying fluid under pressure to the fluid-pressure brake means of the rear wheels, in the illustrated example, lose their fluid-tightness. With the structure of the invention the service people during periodic check of the vehicle will of course be careful to check as to whether or not there are any leaks in the lines, or the like, and at this time when the vehicle is being serviced the lack of fluid-tightness can be detected and repaired, so that as a result with the structure of the invention the operator can continue to make use of the vehicle until it is next brought in for its regular service where a check of the vehicle will bring out the fact that the fluid lines of the brake system must be replaced or other repairs must be carried out.

It will be understood that each of the elements described above, or two or more together, may also find a useful application in other types of brake means differing from the types described above.

While the invention has been illustrated and described as embodied in vehicle braking structures, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a braking assembly for vehicles, in combination, a braking unit including fluid-pressure brake means and spring-pressure brake means; a source of fluid pressure; conduit means communicating with said source of fluid pressure and said fluid-pressure brake means for supplying fluid under pressure to said fluid-pressure brake means so as to actuate the latter when the fluid pressure of the fluid supplied to said fluid-pressure brake means is increased to a predetermined pressure; operator actuated valve means in said conduit means for opening the latter to increase the fluid pressure of fluid supplied to said fluid-pressure brake means to brake the vehicle with the fluid-pressure brake means of said unit; and means maintaining said spring-pressure brake means inoperative while the fluid pressure of said fluid in said conduit means supplied to said fluid-pressure brake means during actuation of said valve means is at least equal to said predetermined pressure but responding automatically to actuation of said operator actuated valve means upon a drop of pressure of the fluid in said conduit means below said predetermined pressure for rendering said spring-pressure brake means automatically operative.

2. In a braking assembly for vehicles, in combination, a braking unit including fluid-pressure brake means and spring-pressure brake means; a source of fluid under pressure; conduit means providing communication between said source and said fluid-pressure brake means to supply the latter with fluid under pressure, said conduit means including operator-actuated valve means for supplying additional fluid under pressure to said fluid-pressure brake means for actuating the latter; separate operator-actuated means operatively connected with said spring-pressure brake means to manually actuate the latter so as to brake the vehicle by said spring-pressure brake means, whenever desired; and means responding automatically to actuation of said operator-actuated valve means upon a drop in the fluid pressure of said unit and in at least a portion of said conduit means communicating therewith for automatically rendering said spring-pressure brake means operative upon actuation of said operator-actuated valve means without actuation of said separate operator-actuated means.

3. In a braking assembly for vehicles, in combination, at least two braking units both of which have a fluid-pressure braking means and at least one of which has also a spring-pressure braking means; a source of pressure fluid; conduit means extending from said source to the fluid-pressure brake means of both of said units for supplying them both with pressure fluid, said conduit means having a pair of branches respectively communicating with said units; operator-actuated valve means in said conduit means for supplying fluid under pressure from said source to said units for actuating said fluid-pressure brake means thereof; and differential valve means communicating with said branches for responding to a pressure differential in the fluid pressure of said units in such a manner as to maintain said spring-pressure brake means inoperative while said fluid pressure in said conduit means is sufficient to actuate said fluid-pressure brake means, but automatically rendering said spring-pressure brake means of said one unit operative when the fluid pressure of said one unit is less than the fluid pressure of the other of said units by a given differential.

4. In a braking assembly as recited in claim 3, said differential valve means having a differential means portion and a valve means portion, said differential means portion including a housing having a hollow interior and carrying in its interior a diaphragm dividing said interior into a pair of chambers, said branches of said conduit means respectively communicating with said chambers and said branch of said one unit communicating with said fluid-pressure brake means of said one unit, and said differential valve means including an elongated tubular member having a pair of opposed open ends one of which is in permanent communication with the outer atmosphere, said tubular member extending through and being carried by said diaphragm for movement therewith when said diaphragm is deflected in response to a pressure differential existing between the fluid pressure of said fluid-pressure brake means of said units, said valve means portion of said differential valve means communicating with said source of fluid pressure and with said spring-pressure brake means of said one unit and maintaining said source in communication with said spring-pressure brake means to maintain the latter inoperative as long as said pressure differential is less than a predetermined amount, said valve means portion responding to movement of said tubular member when said diaphragm is deflected upon said differential pressure exceeding said predetermined amount for closing off communication between said source and said spring-pressure brake means and placing the latter through said tubular member in communication with the outer atmosphere so that said spring-pressure brake means automatically responds to become activated.

5. In an assembly as recited in claim 4, said valve means portion of said differential valve means including an annular valve seat through which said tubular member extends with substantial clearance said source and said spring-pressure brake means of said one unit respectively communication with opposite sides of said valve seat, and said valve means portion including a valve member seated on the other of said open ends of said tubular member for maintaining said other end thereof closed as long as the pressure differential is less than said predetermined amount, so that said spring-pressure brake means communicates with said source through the space between said annular valve seat and said tubular member which is provided by said clearance therebetween, said tubular member when displaced by said diaphragm when said pressure differential exceeds said predetermined amount moving to a position where said other end thereof is spaced from said valve member while the latter is seated on said valve seat and where said other end of said tubular member communicates with said spring-pressure brake means, so that the seating of said valve member on said valve seat cuts off communication between said source and said spring-pressure brake means while the latter communicates through said other open end of said tubular member with the interior thereof and through said one open end thereof with the outer atmosphere.

6. In an assembly as recited in claim 5, spring means urging said valve member toward said valve seat.

7. In an assembly as recited in claim 5, spring means acting on said diaphragm with a force which opposes the fluid pressure of the other of said units.

8. In a braking assembly for vehicles, in combination, a pair of containers each containing a fluid under pressure; main operator-actuated valve means communicating with said containers; a pair of braking units both of which have fluid-pressure brake means and one of which has in addition a spring-pressure brake means, said main valve means communicating with said fluid-pressure brake means of both units for actuating the latter at the option of the operator for retarding the movement of a vehicle; conduit means providing communication between both of said containers and said spring-pressure brake means for maintaining the latter inoperative with the fluid pressure, said conduit means including three branches two of which respectively communicate with said containers and a third of which communicates with said spring-pressure brake means; two-way valve means at a location where said three branches of said conduit means meet for directing fluid under pressure from said two branches to said third branch and for automatically maintaining pressure fluid flowing to said third branch from one of said two branches when for any reason there is an interruption in the flow of fluid from the other of said two branches; auxiliary operator-actuated valve means operatively connected with said third branch of said conduit means for cutting off communication between said containers and said spring-pressure brake means and placing the latter in communication with the outer atmosphere when said auxiliary valve means is actuated by the operator, so that the vehicle will then be braked by said spring-pressure brake means, said auxiliary valve means having a rest position maintaining communication between said containers and said spring-pressure brake means; and differential valve means communicating with the fluid-pressure brake means of both units for sensing a differential in the pressure therebetween and also communicating with said third branch of said conduit means for automatically cutting off communication between said container and said spring-pressure brake means while simultaneously placing the latter in communication with the outer atmosphere when upon actuation by the operator of said main valve means the pressure differential between the fluid-pressure brake means of both units is above a predetermined amount.

9. For use in a vehicle braking installation, a differential valve assembly comprising, in combination, a housing having a hollow interior; a diaphragm extending across the hollow interior of said housing and dividing the interior thereof into a pair of chambers adapted respectively to communicate with a pair of fluid-pressure brake means so that the diaphragm will respond to a pressure differential between said pair of fluid-pressure brake means; an elongated tubular member extending through and carried by said diaphragm for movement therewith and having a pair of opposed open ends one of which is in permanent communication with the outer atmosphere; and valve means having a first closed position closing the other of the ends of said tubular member while maintaining communication between a source of fluid pressure and a spring-pressure brake means which is rendered inoperative by the fluid pressure from said source, and a second closed position cutting off communication between said source of fluid pressure and said spring-pressure brake means while uncovering said other open end of said tubular member to place said spring-pressure brake means in communication with the outer atmosphere through said tubular member so as to render said spring-pressure brake means operative, said diaphragm maintaining said tubular member in a position placing said valve means in said first closed position thereof as long as the pressure differential between said chambers is less than a given amount and said diaphragm displacing said tubular member to a position locating said valve means in said second closed position thereof when the pressure differential acting on said diaphragm is greater than said given amount.

10. A differential valve assembly as recited in claim 9 wherein said valve means includes an annular valve seat surrounding said tubular member with a clearance providing a predetermined annular gap between said valve seat and tubular member and said source of fluid pressure and spring-pressure brake means communicating with each other through said gap while said valve means is in said first closed position thereof, said valve means including a valve member which is maintained displaced from said valve seat by said other end of said tubular member while the pressure differential acting on said diaphragm is less than said given amount, displacement of said tubular member by said diaphragm when said pressure differential exceeds said given amount resulting in movement of said other end of said tubular member and said valve member toward said valve seat until the latter is engaged and closed by said valve member while said other end of said tubular member continues to move so as to be spaced from said valve member and thus uncovered thereby, whereby said spring-pressure brake means can then communicate through said tubular member with the outer atmosphere.

References Cited by the Examiner

UNITED STATES PATENTS 3,181,426  5/1965  Ike ------------------ 303—9
3,198,086  8/1965  Rager et al. ---------- 303—9

BENJAMIN HERSH, *Primary Examiner.*

EUGENE G. BOTZ, *Examiner.*

M. S. SALES, *Assistant Examiner.*